J. E. KEPPEL.
VALVED AIR PUMP.
APPLICATION FILED OCT. 21, 1916.
1,234,908.
Patented July 31, 1917.
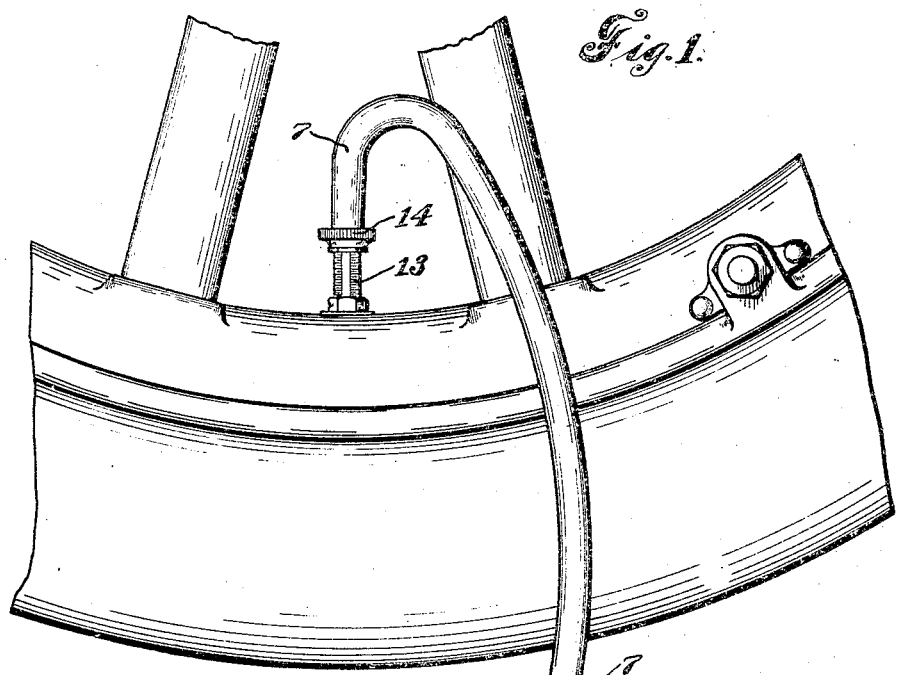
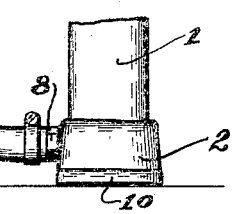
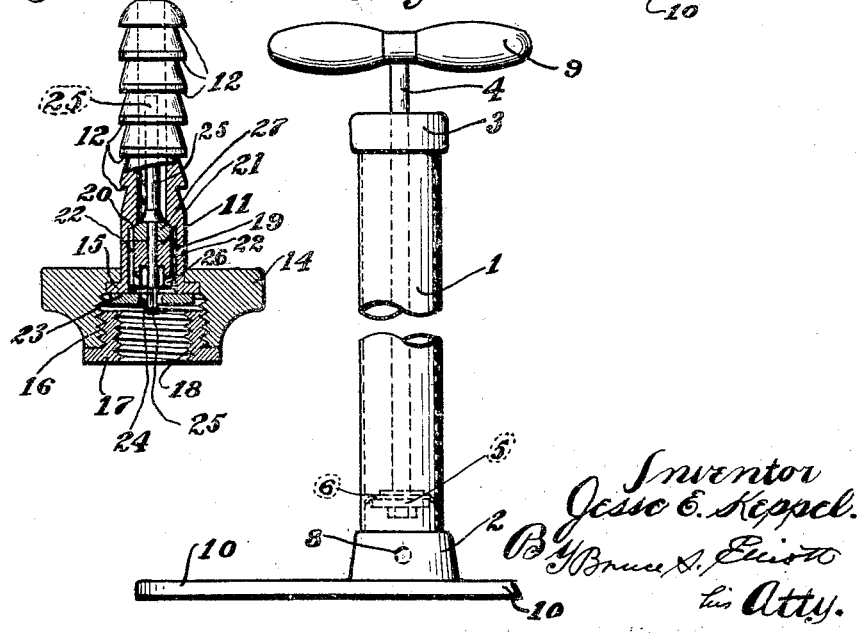
Inventor
Jesse E. Keppel.
By Bruce A. Elliott
his Atty.

UNITED STATES PATENT OFFICE.

JESSE E. KEPPEL, OF ST. LOUIS, MISSOURI.

VALVED AIR-PUMP.

1,234,908.  Specification of Letters Patent.  Patented July 31, 1917.

Application filed October 21, 1916. Serial No. 126,819.

*To all whom it may concern:*

Be it known that I, JESSE E. KEPPEL, a citizen of the United States, residing in the city of St. Louis and State of Missouri, have invented new and useful Improvements in Valved Air-Pumps, of which the following is a specification.

This invention relates to apparatus for charging air containers of any kind, and the invention is particularly applicable to small hand-operated air pumps such as are used for charging pneumatic tires with air. When these pumps are used for this purpose it frequently happens that the valve in the inflating nipple of the tire leaks considerably, and this causes a back flow of air in the hose leading from the nipple to the pump. This results in a loss in efficiency in the operation of the pump. In order to meet this difficulty it has been customary to construct such pumps with a valve at or near the point where the air passes into the hose from the pump. The necessity for placing a valve in the connection between the hose and the pump occasions considerable increase in the cost of the pump for the reason that a special valve chamber must be formed at the side of the pump, properly machined and provided with coöperating parts which are necessary to the operation of the valve.

The hose of such a pump is necessarily provided at its outer end with means for connecting it to the container or tire which is to receive the air. The general object of my invention is to provide a pump and hose of this kind with a very simple construction which will considerably reduce the cost of its manufacture, and which will obviate the necessity for employing a valve at the pump to prevent the back flow of air to which I refer. In making this improvement I utilize other necessary parts of the apparatus to house the valve, and adapt them to perform this additional function of carrying the valve by extremely simple means.

Further objects of the invention will appear hereinafter.

In the drawing which illustrates the preferred embodiment of my invention—

Figure 1 is a side elevation, partly broken away, and illustrating the manner in which the pump may be employed in practice, as in inflating a pneumatic tire;

Fig. 2 is a longitudinal section and partial side elevation of the connecting means which is employed at the end of the hose and illustrating how my valve is carried thereby;

Fig. 3 is a side elevation, partly broken away, further illustrating the pump.

Referring more particularly to the parts, the pump may be of any simple form, comprising a barrel 1, attached to a base 2 and provided at its upper end with a cap or head 3 through which passes a stem or piston rod 4. The inner end of the rod 4 carries a piston head 5 of any simple form. That usually employed consists of a simple cup-leather 6 which operates as a valve on the up stroke to permit the air to pass into the lower end of the cylinder or barrel, but which is pressed outwardly by the air pressure against the wall of the cylinder on the down stroke of the piston so that it becomes substantially air-tight, the air then being forced outwardly through a hose 7 which is attached at a suitable connection 8 on the side of the base. The outer end of the piston rod 4 is provided with a handle 9 for reciprocating the piston, and the base 2 is provided with oppositely-projecting feet 10 upon which the person operating the pump may place his feet in order to hold the pump. Heretofore it has been necessary to place a valve at the location of the connection 8, and this has necessitated a special construction at the base 2 in order to provide a valve chamber and properly house the valve.

The outer end of the hose is provided with a connecting member 11 to enable the hose to be attached when charging a container or a pneumatic tire. For this purpose the connecting member 11 is preferably in the form of an elongated tubular bushing, the body of which is provided with external circumferential ribs or shoulders 12, which enable it to hold itself in the hose when shoved into the open end of the hose. This connecting member is provided with means for attaching it to the inflating nipple 13. For this purpose there is provided a swivel-head or thumb-head 14, which is mounted to rotate freely on a retaining collar 15 formed on the end of the bushing. And on the outer side of this thumb-head 14 a threaded bore 16 is provided in which is attached a bushing 17 which is itself provided with internal threads 18 to screw onto the thread at the end of the nipple 13. The use of a separate bushing, such as the bushing 17, is advisable at this point because it enables different diameter threads to be used at 18 when desired to correspond with any diameter of thread to which the hose is to be connected. According to my invention I make the connection 8 between the hose and the pump a valveless connection, and I utilize these parts just described at the end of the hose to carry my valve. In this connection it is understood that all the parts at the end of the hose which I have described are now necessary simply for making the connection of the hose to the inflating nipple.

In order to place a valve at the connecting member 11 I simply form a counter-bore 19 in the end of the bushing 11 near the collar 15, the inner end of this counter-bore forming a valve seat 20. In this valve chamber 19 I mount a self-seating check valve 21, which may be of any suitable construction. The valve illustrated has grooves 22 along its side which let the air pass when the valve is off its seat, and the valve is retained in the bushing 11 by means of the small bushing 17 and retaining means constructed so as to leave the end of the valve exposed to the interior pressure of the tire. This is in the form of a washer 23 which is located between the inner end of the bushing 17 and the collar 15. This washer 23 is perforated; as illustrated it has a single central opening 24 with which the side grooves 22 communicate when the valve is in its open position. The valve may comprise a stem 25, the inner end of which extends into the tubular bushing 11, and the outer end of which passes through the opening 24 in the washer. The outer end of the valve is preferably cut away, as indicated at 26, so as to insure that the grooves 22 will communicate freely with the opening 24 when the valve is in its open position. The valve 21 may have a soft rubber gasket 27. It is evident that the perforation in the washer exposes the rear end of the valve to the internal pressure of the tire. It is evident that this valve will be actuated solely by air pressure, and will operate as a check valve to prevent the return flow of air on the up stroke of the piston 4, in this way preventing any loss of efficiency in the actuation of the pump. At the same time it obviates the necessity for using a valve at the connection 8 and does not increase the expense of the hose connection appreciably.

In repairing punctured tires it is customary to remove the valves of each tire before repairing it, and on this account one of the advantages arising from placing the return check valve 21 at the end of the hose is that when using the pump to test the repaired tire the test can be made before replacing the tire valve. And furthermore, when using the pump in this way if the hose 7 should burst from the internal pressure the air in the tire is not lost, as it otherwise would be if the valve of the pump were located at the connection 8.

It is understood that the embodiment of the invention described herein is only one of the embodiments my invention may take, and I do not wish to be limited in the practice of my invention, nor in my claims, to the particular embodiment set forth.

What I claim is:—

1. In apparatus for charging a container with compressed air, the combination of an air pump, a flexible hose, a valveless connection between said pump and said hose, a connecting member carried by said hose and having means for attaching the same to the container, a check valve actuated solely by air pressure, and mounted in said connecting member to open in the direction in which the air flows from said pump and operating to prevent back flow of air in said hose toward said pump, retaining means engaged by said valve to limit the opening movement thereof, and a connecting member for making connection to an inflating nipple and for retaining said retaining means.

2. In apparatus for charging a container with compressed air, the combination of an air pump, a flexible hose, a valveless connection between said pump and said hose, a connecting member in the form of a bushing carried by said hose and having a swivel head rotatable on said bushing for attaching the same to the container, a check valve actuated solely by air pressure, and mounted in said connecting member to open in the direction in which the air flows from said pump, and operating to prevent back flow of air in said hose toward said pump, and retaining means for said check valve constructed so as to leave the end of said valve exposed to the interior pressure of the container.

3. In apparatus for charging a pneumatic tire with compressed air, the combination of an air pump, a flexible hose, a valveless connection between said pump and said hose, a connecting member in the form of a bushing carried by said hose, a swivel head carried thereby and loosely rotatable thereupon for attaching the same to the inflating nipple of the tire, a self-seating check valve mounted in said connecting member opening in the direction in which the air flows from said pump and operating to prevent back flow of air in said hose toward said pump, a perforate retaining washer for said valve, leaving the outer end of said valve exposed to the interior pressure of the tire, and a bushing in said swivel head retaining said washer and having threads for attaching the same to the inflating nipple of the tire.

In testimony whereof, I have hereunto set my hand.

JESSE E. KEPPEL.